Patented Apr. 16, 1935

1,997,924

UNITED STATES PATENT OFFICE 1,997,924

PLASTIC SEALING CEMENT

Elbie D. Curtis, Bingham, Maine

No Drawing. Application November 7, 1933, Serial No. 697,069

1 Claim. (Cl. 106—8)

This invention relates to a cement and one object of the invention is to produce a cement which can be effectively used for sealing pipe joints, calking boats, closing leaks in roofs or automobile tops.

Another object of the invention is to provide a cement of such consistency that when it is used for calking a seam of a boat or forced into a crack or other leak it will remain sufficiently plastic to permit expansion and contraction due to changes in temperature without cracking or working out of place.

Another object of the invention is to produce a cement which very effectively fill minute space between threads of coupled pipes and be not only water proof but also not affected by gasoline and other fluids which have injurious effects upon certain cements now in use and cause them to deteriorate.

Another object of the invention is to produce a cement which can be easily mixed and is formed of ingredients readily obtained at a small cost.

The improved cement consists of the following ingredients in approximately the proportions set forth.

|  | Pounds |
|---|---|
| Asbestos | 2½ |
| Asphalt | 6 |
| Rosin | 2 |

When compounding this cement the asbestos is used in its natural state instead of being ground as its long fibers serve as an effective carrier or binder for the asphalt and rosin and impart sufficient body to the cement to retain it in place when used in a seam or pipe joint and prevent it from running when used to heal a leak in a roof or as a top dressing for an automobile. The asbestos, asphalt and rosin are thoroughly mixed together in a suitable container and are heated during mixing so that the asphalt and rosin will be intermingled one with the other and the asbestos evenly distributed therein. The rosin is preferably melted before being used. When so mixed, in the proportions set forth, the cement has the consistency of a thick paste and can be easily forced into a seam of a boat or a crack, nail opening, or other opening found in a plank where it will seal the seam or opening and prevent water from leaking into the boat. The rosin acts as an adhesive and causes the cement to be sufficiently sticky to firmly adhere to the wood or other surface to which it is applied and remain in intimate engagement therewith while the asphalt imparts elasticity to the cement and permits it to expand and contract during changes in temperature without cracking.

When the cement is used to seal a threaded pipe coupling it can be thinned somewhat by adding a sufficient quantity of asphalt and if used to calk a pipe joint having sections drawn together by bolts the quantity of asbestos used will be increased in order to give it more body and form a good calked joint. The substances are not affected by gasoline and therefore couplings of a fuel line or conduit through which gasoline is to flow or be forced by a pump can be sealed against leakage or loss of pressure. The cement is also to be thinned when used as a roofing cement or top dressing for an automobile.

Attention is called to the fact that my cement contains no poison, and can thus be used in many places where a composition containing poison cannot be used. My cement is such that it can be used for water pipes, pipe joints, for use in grafting trees, filling cavities in trees etc. Furthermore, it can be used in large water mains where the large mains can be readily coupled, not requiring the employment of melted lead.

I do not have to employ melted lead, which is considered dangerous in such cases, and which requires thorough tamping by hand in order that the joints shall become thoroughly tight, which is not necessary by the employment and use of my improved cement.

Having thus described the invention, what is claimed is:

A thick pasty cement composition consisting of the following ingredients in approximately the proportions set forth; long fibre asbestos shreds 2½ pounds, asphalt 6 pounds, and rosin 2 pounds, all thoroughly intermingled together with the application of heat.

ELBIE D. CURTIS.